(12) United States Patent
Iwabuchi et al.

(10) Patent No.: US 6,541,773 B1
(45) Date of Patent: Apr. 1, 2003

(54) RADIATION IMAGE DETECTING APPARATUS

(75) Inventors: Yasuo Iwabuchi, Kanagawa (JP); Seiji Tazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/570,912

(22) Filed: May 15, 2000

(30) Foreign Application Priority Data

May 14, 1999 (JP) .......................................... 11-134599

(51) Int. Cl.[7] .................................................. G01T 1/24
(52) U.S. Cl. .................................................. 250/370.11
(58) Field of Search .............................. 250/370.11, 367

(56) References Cited

U.S. PATENT DOCUMENTS

| | | | | |
|---|---|---|---|---|
| 3,225,193 A | * | 12/1965 | Hilton et al. ................ 250/367 |
| 4,069,355 A | * | 1/1978 | Lubowski et al. ............ 427/70 |
| 4,074,482 A | * | 2/1978 | Klahr ........................... 52/171 |
| 4,658,141 A | * | 4/1987 | Wilt et al. ............... 250/361 R |
| 4,982,095 A | * | 1/1991 | Takahashi et al. .......... 250/367 |
| 5,153,438 A | | 10/1992 | Kingsley et al. ....... 250/370.09 |
| 5,391,879 A | | 2/1995 | Tran et al. ................... 250/367 |
| 5,569,530 A | * | 10/1996 | Dooms et al. .............. 428/323 |
| 5,636,299 A | * | 6/1997 | Bueno et al. ................. 385/15 |

\* cited by examiner

*Primary Examiner*—Constantine Hannaher
*Assistant Examiner*—Shun Lee
(74) *Attorney, Agent, or Firm*—Sughrue Mion, PLLC

(57) ABSTRACT

An improvement of a radiation image detecting apparatus composed of a phosphor screen that converts radiation into visible light and a two-dimensionally extended photodetector placed on one surface of the screen, resides in that the phosphor screen is composed of a partition that divides the screen on its plane to give small sections and phosphor-incorporated areas that are sectioned with the partition. The phosphor-incorporated areas and the partition scatter the visible light with scattering lengths of 20 to 200 μm and 0.05 to 20 μm, respectively, providing that a ratio of the former to the latter is 3.0 or higher, and each of the phosphor-incorporated areas and the partition absorbs the visible light with an absorption length of 1,000 μm or longer.

14 Claims, 4 Drawing Sheets

(1)

(2)

RADIATION IMAGE DETECTING APPARATUS

FIELD OF THE INVENTION

The present invention relates to a radiation image detecting apparatus advantageously employable for a radiation image forming method. The apparatus comprises a combination of a phosphor screen and a two-dimensionally extended photo-detector.

BACKGROUND OF THE INVENTION

In a variety of radiography such as X-ray radiography for medical diagnosis or non-destructive inspection, a radiation image forming method (i.e., radiographic photography) utilizing a combination of a radiographic film and a radiographic intensifying screen is generally used. The radiographic intensifying screen absorbs radiation such as X-rays, and emits light in a visible region. Hence, the radiographic film is exposed to both of the emitted visible light and the radiation to form a radiation image on the film. The intensifying screen usually comprises a support, a phosphor layer and a protective film overlaid in order. The phosphor layer usually comprises a binder and phosphor particles dispersed therein, but it may consist of agglomerated phosphor with no binder. The phosphor layer containing no binder can be formed by deposition process or firing process. Further, in order to prevent diffusion of the visible light (luminescence) emitted from the phosphor in the phosphor layer, a partition that divides the phosphor layer on its plane to give small sections may be provided.

Recently, in the field of digital radiography, a radiation image forming method utilizing a radiation image detecting apparatus which comprises a combination of a phosphor screen sectioned in the form of pixels and a two-dimensionally extended photo-detector has been proposed. This method comprises the steps of converting radiation such as X-rays into visible light by means of the phosphor screen, detecting the visible light by means of the photo-detector to obtain electric signals of image information, and transferring the signals to a proper image-reproducing means so as to form a radiation image. For the two-dimensionally extended photo-detector, devices such as photo-diodes, photo-transistors, photo-electroconductive elements and charge-coupled devices (CCD) are used.

U.S. Pat. No. 5,153,438 discloses a combination of a phosphor screen having been sectioned to give a large number of pixels and an array of photo-detectors. Each pixel of the phosphor screen is designed to have the same size and shape as those of each photo-receiving cell of the photo-detector array, so that each pixel may correspond to each cell by a one to one mode. The phosphor screen is formed in the form of pixels by deposition process, notching process, abrasion process, or chemical etching process. The spaces between the pixels may be filled with a light-reflecting material such as titanium dioxide.

Japanese Patent Provisional Publication No. 7-198852 discloses a constitution in which a photo-fiber plate is provided between the phosphor screen in the form of pixels and the array of photo-detectors. In this constitution, each detector of the array corresponds to photo-fibers of the plate and pixels of the screen by a one to one or one to more mode. The spaces between the pixels may be filled with a material having a refractive index lower than that of the material of pixels (e.g., phosphor having different composition from that in the pixels) so that the emitted light may be enclosed in each pixel.

It is desired that even a phosphor screen in the form of pixels for the use in the aforementioned radiation image detecting apparatus give a radiation image of high quality (particularly, high sharpness for high resolution) with a small dosage of radiation.

SUMMARY OF THE INVENTION

It is an object of the present invention to provide a radiation image detecting apparatus giving a radiation image of high quality, particularly high sharpness.

The inventors have studied about the phosphor screen of the apparatus, and found that a specifically designed phosphor screen gives a radiation image of high quality. The phosphor screen employed in the invention comprises a partition that divides the screen on its plane to give small sections and phosphor-incorporated areas that are sectioned with the partition to give a large number of pixels. In the phosphor screen in the form of pixels, the partition is designed to scatter luminescence emitted from the phosphor with a short scattering length, so as to exhibit such a high reflectance enough to effectively prevent planar diffusion of the luminescence. At the same time, the partition is also designed to absorb the luminescence with a long absorption length, so as to exhibit such an absorbance enough to avoid lowering the amount of the observed luminescence. On the other hand, the phosphor-incorporated areas are designed to scatter and absorb the luminescence with a long scattering length and a long absorption length, respectively. Since the phosphor-incorporated areas are thus made to have a high transmittance and a low absorbance to the luminescence, the luminescence emitted from the phosphor near the surface exposed to radiation (i.e., the luminescence emitted from the phosphor far from the photo-detector) can be effectively collected.

The present invention resides in a radiation image detecting apparatus comprising a phosphor screen that converts radiation into visible light and a two-dimensionally extended photo-detector placed on one surface of the screen, wherein the phosphor screen comprises a partition that divides the screen on its plane to give small sections and phosphor-incorporated areas that are sectioned with the partition, the phosphor-incorporated areas and the partition scattering the visible light with scattering lengths of 20 to 200 $\mu$m and 0.05 to 20 $\mu$m, respectively, providing that the ratio between them is not less than 3.0, and the phosphor-incorporated areas and the partition absorbing the visible light (emitted from the phosphor) with an absorption length of not less than 1,000 $\mu$m.

The scattering length indicates a mean distance in which light travels straight until it is scattered, and hence a small value means that the light is highly scattered. Also, the absorption length indicates a mean distance in which light travels straight until it is absorbed, and hence a large value means that the light is hardly absorbed. The scattering length and the absorption length can be obtained by measuring the thickness "d" and the transmittance "T" of the film sample and calculating from them according to the following formula (1) based on Kubeluka-Munk theory.

$$T(d) = (\eta - \xi)/(\eta \cdot \exp(\gamma d) - \xi \cdot \exp(-\gamma d)) \qquad \text{Formula (1)}$$

in which $\gamma^2 = \beta(\beta + 2\alpha)$ $\xi = (\alpha + \beta - \gamma)/\alpha$ $\eta = (\alpha + \beta + \gamma)/\alpha$ The scattering length $1/\alpha$ and the absorption length $1/\beta$ can be obtained by incorporating the measured d and T values into the formula (1) and optimizing, for example, using a least squares method.

Preferred embodiments of the phosphor screen used in the radiation image detecting apparatus of the invention are described below.

(1) The phosphor screen in which the phosphor-incorporated areas contain at least a phosphor and a binder.

(2) The phosphor screen in which the phosphor-incorporated areas contain the phosphor in a volume ratio of 40 to 95% and has a void volume of 0 to 20%.

(3) The phosphor screen in which the partition contains at least low photo-absorbing fine particles and a polymer material.

(4) The phosphor screen in which the partition contains the low photo-absorbing fine particles in a volume ratio of 30 to 90%.

(5) The phosphor screen in which the low-photo-absorbing fine particles have a mean size in the range of 0.01 to 5.0 μm.

(6) The phosphor screen in which the low photo-absorbing fine particles are alumina fine particles.

(7) The phosphor screen in which the partition contains voids.

(8) The phosphor screen in which the partition contains a void volume of 10 to 70%.

(9) The phosphor screen in which the low photo-absorbing fine particles and the voids have refractive indexes between which ratio is in the range of 1.1 to 3.0 (in terms of former/latter).

(10) The phosphor screen in which the partition further contains a phosphor.

(11) The phosphor screen in which the partition further contains a material that absorbs visible light.

(12) The phosphor screen having a thickness of 50 to 1,500 μm.

DETAILED DESCRIPTION OF THE INVENTION

The radiation image detecting apparatus-according to the invention comprises a phosphor screen and a two-dimensionally extended photo-detector. The phosphor screen comprises a partition that divides the screen on its plane to give small sections and phosphor-incorporated areas that are sectioned with the partition.

The constitution of the phosphor screen is explained below by referring to the attached drawings.

Figure 1:
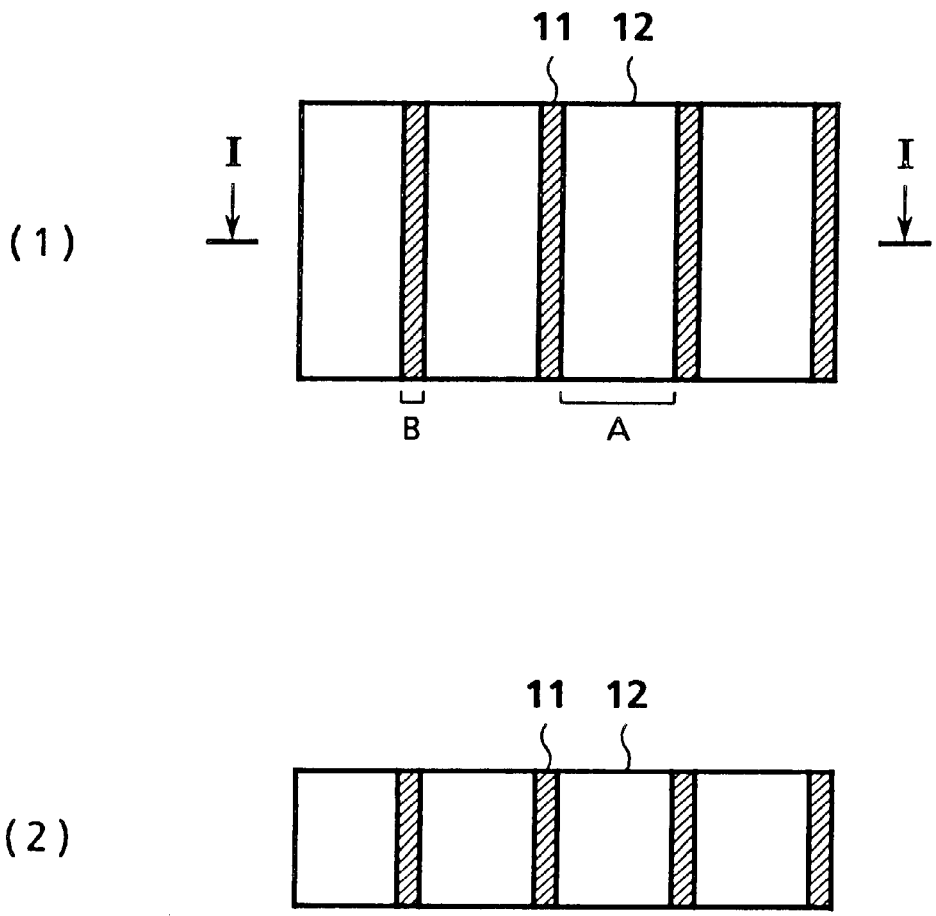
FIG. 1 (1) is a plane view schematically illustrating an example of the phosphor screen of the apparatus according to the invention, and FIG. 1 (2) is a sectional view along I—I line.

FIG. 1 shows a plane view (1) schematically illustrating a phosphor screen of the apparatus according to the invention, and it also shows a sectional view (2) of the screen sectioned with I—I line. In FIGS. 1 (1) and (2), the shadowed parts indicate partitions 11 and the blank parts between the shadowed parts are phosphor-incorporated areas 12. For a high absorption efficiency for radiation such as X-rays, the phosphor screen generally has a thickness of 50 to 1,500 μm. Further, in order to ensure a suitable resolution and image quality, each phopshor-incorporated area preferably has an average width "A" (in plane) in the range of 5 to 300 μm and the partition preferably has a width "B" in the range of 0.5 to 50 μm. The phosphor-incorporated areas preferably occupy 40 to 98% of the surface area of the screen (i.e., the aperture ratio is preferably in the range of 40 to 98%).

The phosphor-incorporated areas 12 scatter and absorb luminescence from the phosphor with a scattering length $1/\alpha 1$ of 20 to 200 μm and an absorption length $1/\beta 1$ of not less than 1,000 μm, respectively. If the scattering length $1/\alpha 1$ is shorter than 20 μm, the luminescence emitted from a vicinity of the surface exposed to radiation can not sufficiently reach the photo-detector, whereby lowering the sensitivity. The partition 11 scatters and absorbs the luminescence with a scattering length $1/\alpha 2$ of 0.05 to 20 μm and an absorption length $1/\beta 2$ of not less than 1,000 μm, respectively. If the scattering length $1/\alpha 2$ is longer than 20 μm, the luminescence diffuses beyond the partition to impair the sharpness. Further, if the absorption length $1/\beta 1$ or $1/\beta 2$ is shorter than 1,000 μm, the luminescence is excessively absorbed to give unsatisfactory low sensitivity. The ratio between the scattering lengths $1/\alpha 1$ to $1/\alpha 2$ [i.e., $(1/\alpha 1)/(1/\alpha 2)$] is in the range of not less than 3.0. If the ratio is less than 3.0, the luminescence is insufficiently enclosed in the phosphor-incorporated areas to cause imbalance between the sharpness and the amount of the detected luminescence.

The phosphor-incorporated areas 12 preferably comprise at least a binder and phosphor particles dispersed therein, and particularly preferably they comprise phosphor particles, voids (i.e., air portions) and a binder. The volume ratio of the phosphor and the void volume in the phosphor-incorporated areas 12 are preferably in the ranges of 40 to 95% and 0 to 20%, respectively. The phosphor particles preferably have a mean size in the range of 0.1 to 20 μm.

The partition 11 preferably comprises at least a polymer material and low photo-absorbing fine particles dispersed therein, and particularly preferably it comprises low photo-absorbing fine particles, voids and a polymer material. The volume ratio of the low photo-absorbing fine particles and the void volume in the partition 11 are preferably in the ranges of 30 to 90% and 10 to 70%, respectively. The fine particles preferably have a mean size in the range of 0.01 to 5.0 μm. The ratio between the refractive index of the low photo-absorbing fine particles and that of the voids [i.e., the refractive index of the particles/that of the voids] preferably is in the range of 1.1 to 3.0.

In the present invention, the pixel pattern of the screen is not restricted to the linear stripes shown in FIG. 1, in which the partitions 11 and the phosphor-incorporated areas 12 are alternatively arranged. The shape or the position of the partition can be optionally chosen.

Figure 2:
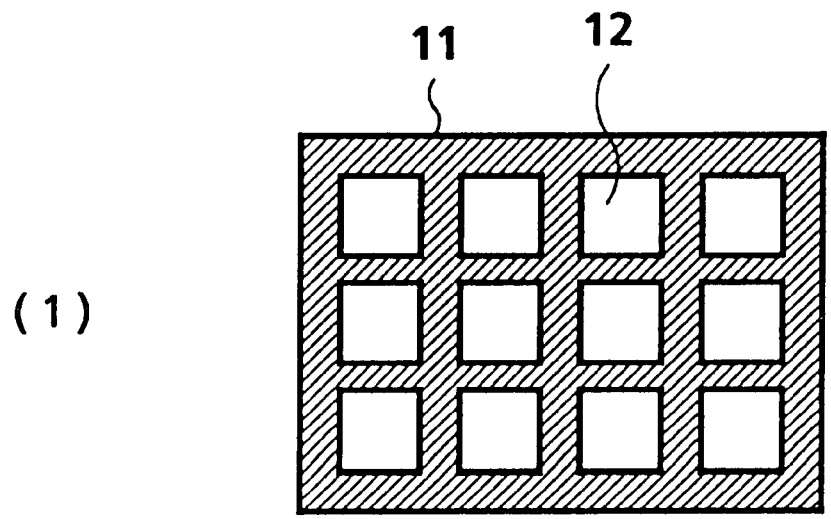
FIGS. 2 (1) and (2) are planar views schematically illustrating other examples of the phosphor screen. These examples comprise different combinations of the partition and the phosphor-incorporated areas.
Figure 2:
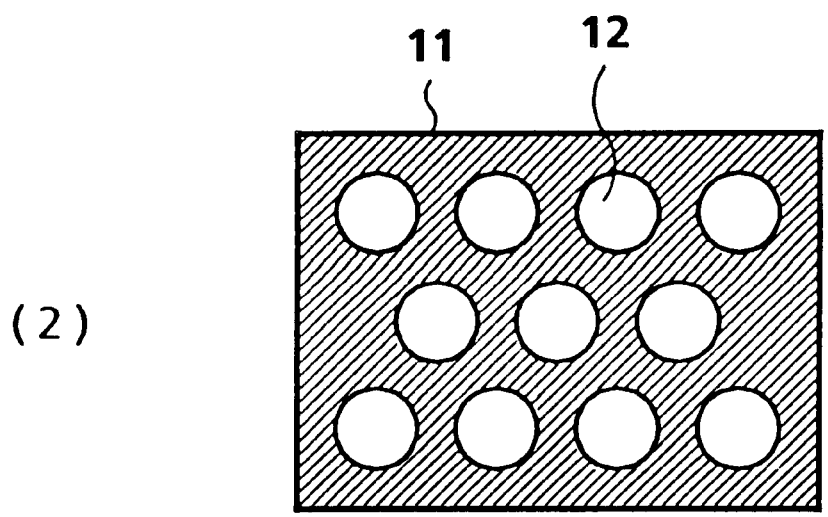

Other examples of the partition are shown in FIG. 2. The screen shown in FIG. 2 (1) has a two-dimensional structure comprising cells (phosphor-incorporated areas) 12 sectioned with a grid partition 11. FIG. 2 (2), on the other hand, shows another two-dimensional structure comprising round cells (phosphor-incorporated areas) 12 surrounded by a partition 11.

In the phosphor screen of FIG. 1, the top and the bottom of the partition 11 appear on the surfaces of the screen.

However, both or one of them may be buried under the screen. Preferably, the height of the partition is in the range of 1/3 to 1/1 of the thickness of the phosphor screen.

The phosphor screen employed in the apparatus of the invention can be produced, for example, by the process described below. The following explanation is described, as an example, with regard to the case where the phosphor-incorporated areas comprise a phosphor, voids and a binder and where the partition comprises low photo-absorbing fine particles, voids and a polymer material.

There is no specific limitation on the phosphor used in the phosphor-incorporated areas, and known phosphors can be used singly or in combination. Examples of the phosphors include $CaWO_4$, $YTaO_4$, $YTaO_4$:Nb, LaOBr:Tm, $BaSO_4$:Pb, ZnS:Ag, $BaSO_4$:Eu, $YTaO_4$:Tm, BaFCl:Eu, BaF(Br, I):Eu, $Gd_2O_2S$:Tb, $Y_2O_2S$:Tb, $La_2O_2S$:Tb, $(Y,Gd)_2O_2S$:Tb and $(Y,Gd)_2O_2S$:Tb, TM.

Examples of the binders include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. They may be crosslinked with a cross-linking agent.

First, the phosphor particles and the binder are placed into a solvent, and mixed well to prepare a coating dispersion for forming the phosphor-incorporated areas. Examples of the solvents include lower aliphatic alcohols such as methanol, ethanol, n-propanol and n-butanol; chlorinated hydrocarbons such as methylene chloride and ethylene chloride; ketones such as acetone, methyl ethyl ketone and methyl iso-butyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures of these solvents.

A ratio between the binder and the phosphor in the dispersion depends on the characteristics of the phosphor and the desired properties of the phosphor screen, but generally they are incorporated at a ratio of 1:1 to 1:100 (by weight), preferably 1:8 to 1:40 (by weight). The coating liquid may further contain various additives such as a dispersing agent for assisting the phosphor particles in dispersing, and a plasticizer for increasing the bonding between the binder and the phosphor particles.

Examples of the low photo-absorbing fine particles for the partition include inorganic fine particles such as particles of aluminum oxide (alumina), gadolinium oxide, titanium oxide or tellurium oxide. Further, fine particles of the aforementioned phosphors are also employable. Alumina is particularly preferred. In order to set the scattering length of the partition within the above-defined range, it is generally preferred that the sizes of the low photo-absorbing fine particles be in the range of 0.01 to 0.5 $\mu$m and that the ratio between the refractive index of the fine particles and that of the voids be in the range of 1.1 to 3.0.

There is no specific limitation on the polymer material (binder resin) for the partition, and the above-described binder materials for the phosphor-incorporated areas can be optionally used. For shortening the scattering length of the partition, it is preferred that the ratio between the refractive index of the low photo-absorbing fine particles and that of the polymer material be in the range of 1.1 to 3.0. In consideration of the refractive index, polymers such as polyurethane, polyacrylic resin, polyethylene, polystyrene and fluorocarbon resins are preferred.

The low photo-absorbing fine particles and the polymer material are placed into a solvent, and mixed well to prepare a coating dispersion for forming the partition. As the solvent, one of the above-described solvents for the phosphor-incorporated areas can be optionally used. The ratio between the polymer material and the fine particles in the dispersion depends on the characteristics of the particles and the desired properties of the phosphor screen, but generally they are incorporated at a ratio of 1:80 to 1:3 (by weight), preferably 1:20 to 1:10 (by weight).

The phosphor screen is produced, for example, by the steps of applying and drying each of the coating dispersions for the phosphor-incorporated areas and for the partition to give plural thin sheets, piling up the thus-formed sheets for the phosphor-incorporated areas and those for the partition alternatively, heating and pressing the sheets to form a multi-layered body, and vertically cutting the body to produce a phosphor screen having a linear striped pattern. After the multi-layered body is vertically cut into thin sheets of the striped pattern, the obtained sheets and the sheets for the partition may be further alternatively piled up, heated and pressed to form another multi-layered body. The thus-formed body may be vertically cut to produce a phosphor screen having a two-dimensional grid pattern.

Otherwise, the sheet prepared from the coating liquid for the partition is subjected to etching process (e.g., dry etching process) using lithography, to form plural hollows or holes so that the sheet may have a honey-comb structure. The hollows or holes are then filled with the coating dispersion for the phosphor-incorporated areas, and dried to produce a phosphor screen of honey-comb structure. The screen of honey-comb structure can be also produced by the steps of beforehand dispersing the low photo-absorbing fine particles in a thermosetting polymer to form a honey-comb body, and intruding the body into a plastic sheet containing a phosphor. During the step of intrusion, heat and/or pressure may be applied.

The void volumes in the phosphor-incorporated areas as well as in the partition can be set within the desired ranges, for example, by heating and pressing the sheets through a calender machine after the sheets are formed by applying and drying the coating liquids. It is not always necessary for the phosphor-incorporated areas and the partition to contain a binder and a polymer material, respectively. The partition without polymer material can be prepared by depositing-or firing the low photo-absorbing fine particles to form honey-comb sheets. The phosphor-incorporated areas without binder can be prepared by filling the hollows or holes of the honey-comb sheets with phosphor materials and then firing them. The phosphor-incorporated areas can be also prepared by depositing a phosphor on the surface of the honey-comb sheet having hollows or holes.

As long as the phosphor-incorporated areas exhibit a scattering length and an absorption length in the above-described ranges, they need not contain voids. Also the partition need not contain voids, and may comprise only the low photo-absorbing fine particles and the polymer material. In place of the voids, the partition may contain an liquid organic material (at room temperature) such as silicone oil or fluorine compounds. Further, the partition may contain a phosphor for increasing the amount of the luminescence or a material absorbing the luminescence for improving the sharpness of the image. Examples of the absorbing materials include blue or green dyes such as ultramarine.

Thus produced phosphor screen need not have a support and/or a protective film, but may have them for ensuring treatability on carrying or for avoiding deterioration. In order to enhance the sensitivity, a light-reflecting layer may be provided on one surface side (if the screen has a support, it may be provided between the screen and the support).

As the support, a sheet or a film of flexible resin material having a thickness of 50 µm to 1 mm is usually employed. The support may be transparent, or may contain light-reflecting material (e.g., titanium dioxide particles, barium sulfate particles) or voids. Further, it may contain light-absorbing material (e.g., carbon black). Examples of the resin materials include polyethylene terephthalate, polyethylene haphthalate, aramid resin, and polyimide resin. The support may be a sheet of other material such as metal, ceramics and glass, if desired. On the upper surface (phosphor screen-side surface) of the support, auxiliary layers (e.g., light-reflecting layer, light-absorbing layer, adhesive layer, electroconductive layer) may be provided. Further, many hollows may be provided on the surface of the support.

The protective film can be provided by fixing a beforehand prepared transparent plastic film on the surface of the phosphor screen with an adhesive, or by coating the screen with a solution of protective film material and drying the solution. Into the protective film, light-scattering fine particles having a high refractive index (e.g., titanium oxide particles) may be incorporated so as to improve the quality of the produced image. Also various other known additives such as an anti-static agent may be added. There is no specific limitation on resin materials for the protective film, but preferred examples of the materials include polyester resins (e.g., polyethylene terephthalate, polyethylene naphthalate), cellulose derivatives (e.g., cellulose triacetate), and various other resin materials such as polyolefin, polyamide, aramid and fluorocarbon resins. The thickness of the protective film generally is in the range of not more than 30 µm, preferably 1 to 15 µm, more preferably 5 to 12 µm.

For the two-dimensionally extended photo-detector used in the apparatus of the invention, devices such as photo-diodes, photo-transistors, photo-electroconductive elements and charge-coupled devices (CCD) can be used. A combination of photo-diodes and thin-film transistors is particularly preferred. Examples of the materials for the detectors include amorphous silicon, single crystal silicon, cadmium tellurate, and copper indium diselenide. With respect to the size of each phosphor-incorporated area and that of the pixel of the photo-detector, it is preferred that the ratio of their surface areas be in the range of 1:1 to 10:1.

Figure 3:
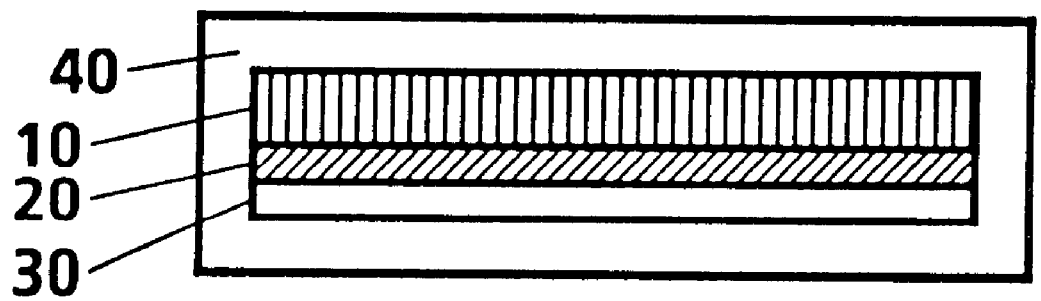
FIG. 3 is a sectional view schematically illustrating the radiation image detecting apparatus of the invention.

The radiation image detecting apparatus of the invention may have a structure, for example, shown in FIG. 3. FIG. 3 is a sectional view schematically illustrating a typical structure of the apparatus. The apparatus shown in FIG. 3 comprises a phosphor screen 10, a two-dimensionally extended photo-detector 20, a substrate 30, and a housing 40. The phosphor screen 10 and the two-dimensionally extended photo-detector 20 are piled up on a substrate 30 in order to form a layered body, which is encased in the housing 40.

Examples of the substrates 30 include sheets of various resins (e.g., polyethylene terephthalate, poly-ethylene naphthalate, aramid resin, polyimide resin), metals, ceramics, and glass.

The housing 40 is made of a material (e.g., lead) shielding the screen and the detector from light or radiation such as X-rays, so that undesirable light or radiation may not affect the screen and the detector to cause noises. However, only the screen side face of the housing is made of a radiation transmittable material so that the phosphor screen can receive radiation having passed through or having emitted from the object.

The present invention is further described by the following examples.

EXAMPLE 1

(1) Production of sheet for phosphor-incorporated areas

BaFBr:Eu phosphor particles (particle size: 5.0 µm) and a thermoplastic high molecular weight-polyester resin (binder) were placed in methyl ethyl ketone in a weight ratio of 5:1, and dispersed by means of a propeller mixer to prepare a coating dispersion (viscosity: 30 PS at 25° C.). The coating dispersion was applied by means of a coating machine, and dried to form thin films. The films were heated and pressed by calendering to reduce voids in the films. Thus, plural sheets for phosphor-incorporated areas (thickness: 20 to 100 µm, volume ratio of the phosphor: 52%, void volume: 3%) were produced.

(2) Production of sheet for partition

Alumina fine particles (size: 1.0 µm) and a high molecular weight-acrylic resin were placed in methyl ethyl ketone in a weight ratio of 15:1, and dispersed by means of a propeller mixer to prepare a coating dispersion (viscosity: 30 PS at 25° C.). The coating dispersion was applied by means of a coating machine, and dried to produce plural sheets for partition (thickness: 10 to 30 µm, volume ratio of the alumina fine particles: 51%, void volume ratio: 38%, ratio between the refractive indexes of alumina fine particles and that of voids: 1.76).

(3) Production of phosphor screen

The above-produced sheets for phosphor-incorporated areas (thickness: 100 µm) and those for partition (thickness: 10 µm) were alternatively piled up (number of the sheets: 360), and heated and pressed to form a layered body. The layered body was sliced with a wide microtome to produce three phosphor screens having striped partitions (thickness: 280 µm, 450 µm, 860 µm).

Comparison Example 1

The procedure of Example 1 (1) was repeated to produce two phosphor screens having no partition (thickness: 448 µm, 678 µm).

[Evaluation of Radiation Image Detecting Apparatus]

With respect to each of the phosphor-incorporated area and the partition of the phosphor sheet produced in Example 1, the transmittance at 400 nm (which is a typical wavelength of the luminescence) was measured by means of a spectrophotometer. From the measured transmittance, the scattering length and the absorption length were calculated according to Kubeluka-Munk theory. The scattering lengths of the phosphor-incorporated area and the partition were 66 µm and 4 µm, respectively. It was also found that the phosphor-incorporated area and the partition hardly absorbed the light, and accordingly their absorption lengths were longer than 1,000 µm.

A two-dimensionally extended photo-detector comprising a layered body of amorphous silicon photo-diodes and thin-film transistors was prepared. On the photo-diode side surface of the photo-detector, each produced screen was tightly overlaid to assemble a radiation image detecting apparatus (shown in FIG. 3). The phosphor side of the apparatus was exposed to X-rays of 80 mA (tube voltage: 80 kVp, amount: 10 mR), and the amount of luminescence was relatively estimated from the intensity of the signal obtained by the detector. Further, a CTF chart was superposed on the surface of the phosphor screen, and then the apparatus was exposed to X-rays in the same manner. From the obtained image data, the sharpness (CTF at 1 lp) was measured to evaluate the image quality. The results are shown in Table 1 as well as in FIG. 4.

TABLE 1

|  | thickness ($\mu$m) | amount of luminescence | sharpness [CTF (1)] |
|---|---|---|---|
| Ex. 1 | 280 | 105 | 82 |
|  | 450 | 133 | 75 |
|  | 860 | 157 | 54 |
| C. Ex. 1 | 448 | 100 | 60 |
|  | 678 | 108 | 45 |

Figure 4:
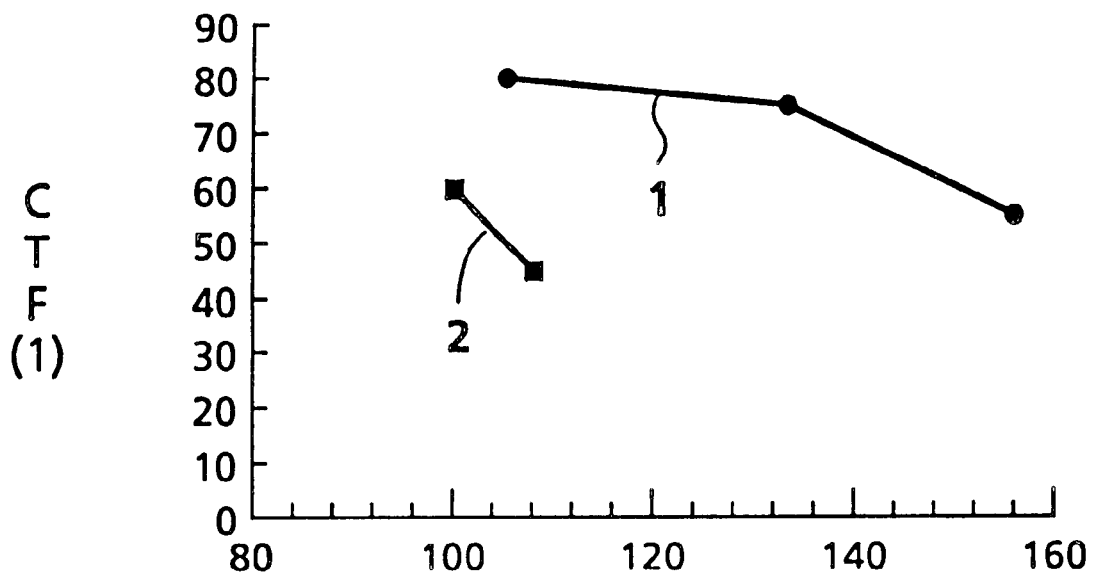
FIG. 4 is a graph showing relations between the amount of the luminescence emitted from the phosphor screen and the sharpness [CTF(1)] of the image.

FIG. 4 is a graph showing relations between the amount of the luminescence emitted from the phosphor screen and the sharpness [CTF(1)] of the image. In FIG. 4, line 1 (connecting solid circles) and line 2 (connecting solid squares) represent the relations in Example 1 and Comparison Example 1, respectively.

The results shown in Table 1 and FIG. 4 indicate that the apparatus of the invention, which comprises a phosphor screen in the form of pixels (Example 1) giving a scattering length and an absorption length in the particular ranges, remarkably improves the luminance (amount of the luminescence) and the sharpness of the obtained image, as compared with a conventional apparatus comprising a phosphor screen having no pixels (Comparison Example 1). This means that the apparatus of the invention can give a radiation image of high quality, particularly high sharpness, providing that the luminance is set at the conventional level.

The radiation image detecting apparatus of the invention comprises a phosphor screen in the form of pixels having a combination of a partition and phosphor-incorporated areas. The partition gives a short scattering length and a long absorption length, and the phosphor-incorporated areas give a long scattering length and a long absorption length. Therefore, diffusion of the luminescence on the plane is prevented enough to give a radiation image of high sharpness, and also the amount of the luminescence absorbed by the partition is reduced enough to effectively collect the luminescence from the surface exposed to radiation so that the detecting efficiency can be remarkably improved in total. Further, by thickening the screen, the absorption efficiency to radiation such as X-rays can be increased so as to obtain an image of further improved quality. Accordingly, the phosphor screen according to the invention can be advantageously used as a recording medium for medical radiography, electron microscopy, or other radiographic processes.

What is claimed is:

1. A radiation image detecting apparatus comprising a phosphor screen that converts radiation into visible light and a two-dimensionally extended photo-detector placed on one surface of the screen, wherein the phosphor screen comprises a partition that divides the screen on its plane to give small areas in which phosphor is incorporated, the phosphor-incorporated areas and the partition scattering the visible light with scattering lengths of 20 to 200 $\mu$m and 0.05 to 20 $\mu$m, respectively, providing that a ratio of the former to the latter is 3.0 or higher, and each of the phosphor-incorporated areas and the partition absorbing length of 1,000 $\mu$m or longer.

2. The radiation image detecting apparatus of claim 1, wherein the phosphor-incorporated areas of the phosphor screen comprises a phosphor and a binder.

3. The radiation image detecting apparatus of claim 1, wherein the phosphor-incorporated areas of the phosphor screen contain a phosphor in a volume ratio of 40 to 95% and has a void volume of 0 to 20%.

4. The radiation image detecting apparatus of claim 1, wherein the partition of the phosphor screen comprises low photo-absorbing fine particles and a polymer material.

5. The radiation image detecting apparatus of claim 4, wherein the partition of the phosphor screen contains the low photo-absorbing fine particles in a volume ratio of 30 to 90%.

6. The radiation image detecting apparatus of claim 4, wherein the low photo-absorbing fine particles have a mean size in the range of 0.01 to 5.0 $\mu$m.

7. The radiation image detecting apparatus of claim 4, wherein the low photo-absorbing fine particles are alumina fine particles.

8. The radiation image detecting apparatus of claim 4, wherein the partition of the phosphor screen contains voids.

9. The radiation image detecting apparatus of claim 8, wherein the partition of the phosphor screen has a void volume of 10 to 70%.

10. The radiation image detecting apparatus of claim 8, wherein a ratio of refractive index of the low photo-absorbing fine particles to the voids is in the range of 1.1 to 3.0.

11. The radiation image detecting apparatus of claim 4, wherein the partition of the phosphor screen further contains phosphor particles.

12. The radiation image detecting apparatus of claim 4, wherein the partition of the phosphor screen further contains a material that absorbs visible light.

13. The radiation image detecting apparatus of claim 1, wherein the phosphor screen has a thickness of 50 to 1,500 $\mu$m.

14. The radiation image detecting apparatus of claim 1, wherein the photo-detector comprises a combination of photo-diodes and thin film transistors.

* * * * *